United States Patent
Kim

(10) Patent No.: US 9,390,318 B2
(45) Date of Patent: Jul. 12, 2016

(54) POSITION-SETUP FOR GESTURE-BASED GAME SYSTEM

(75) Inventor: Seungil Kim, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 104 days.

(21) Appl. No.: 13/805,286

(22) PCT Filed: Aug. 31, 2011

(86) PCT No.: PCT/KR2011/006430
§ 371 (c)(1),
(2), (4) Date: Dec. 3, 2013

(87) PCT Pub. No.: WO2013/032045
PCT Pub. Date: Mar. 7, 2013

(65) Prior Publication Data
US 2014/0211990 A1 Jul. 31, 2014

(51) Int. Cl.
G06K 9/00 (2006.01)
A63F 13/20 (2014.01)

(52) U.S. Cl.
CPC ............ *G06K 9/00342* (2013.01); *A63F 13/06* (2013.01); *A63F 2300/1093* (2013.01); *A63F 2300/6045* (2013.01); *A63F 2300/8088* (2013.01)

(58) Field of Classification Search
None
See application file for complete search history.

(56) References Cited

U.S. PATENT DOCUMENTS

| 5,530,420 A | 6/1996 | Tsuchiya et al. |
| 5,900,849 A | 5/1999 | Gallery |
| 6,663,491 B2 | 12/2003 | Watabe et al. |
| 6,738,066 B1 | 5/2004 | Nguyen |
| 7,489,265 B2 | 2/2009 | Egri et al. |
| 7,636,645 B1 | 12/2009 | Yen et al. |
| 7,702,608 B1 | 4/2010 | Bererton et al. |
| RE41,414 E | 7/2010 | Yamamoto |

(Continued)

FOREIGN PATENT DOCUMENTS

| CN | 2010-35741 Y | 3/2008 |
| CN | 201060264 Y | 5/2008 |

(Continued)

OTHER PUBLICATIONS

International Search Report and Written Opinion from International Application No. PCT/US2012/026515 mailed May 31, 2012.

(Continued)

*Primary Examiner* — Weiwen Yang
(74) *Attorney, Agent, or Firm* — Brundidge & Stanger, P.C.

(57) ABSTRACT

Technologies are generally described for position-setup for gesture-based game. In some examples, a method performed under control of a gesture-based game system includes capturing, by an image capture unit, an image of a first player and an image of a second player, cropping, from the image of the first player and the image of the second player, a first sub-image of at least part of the first player and a second sub-image of at least part of the second player, respectively, determining whether to adjust the first sub-image and the second sub-image, if it is determined to adjust the first sub-image and second sub-image, adjusting the first sub-image and the second sub-image, and merging the first adjusted sub-image and the second adjusted sub-image into an output image.

22 Claims, 11 Drawing Sheets

(56) References Cited

U.S. PATENT DOCUMENTS

| | | | |
|---|---|---|---|
| 8,162,754 B2 | 4/2012 | Asami | |
| 8,657,681 B2 | 2/2014 | Kim | |
| 9,020,239 B2 | 4/2015 | Graepel et al. | |
| 2007/0110298 A1 | 5/2007 | Graepel et al. | |
| 2008/0207308 A1 | 8/2008 | Yoshizawa | |
| 2008/0300055 A1* | 12/2008 | Lutnick et al. | 463/39 |
| 2009/0027337 A1 | 1/2009 | Hildreth | |
| 2009/0077504 A1 | 3/2009 | Bell et al. | |
| 2009/0221368 A1 | 9/2009 | Yen et al. | |
| 2009/0221374 A1 | 9/2009 | Yen | |
| 2010/0148977 A1 | 6/2010 | Tseng et al. | |
| 2010/0210359 A1 | 8/2010 | Krzeslo et al. | |
| 2010/0234094 A1 | 9/2010 | Gagner et al. | |
| 2010/0277411 A1 | 11/2010 | Yee et al. | |
| 2010/0306712 A1 | 12/2010 | Snook et al. | |
| 2011/0080490 A1 | 4/2011 | Clarkson et al. | |
| 2011/0119640 A1 | 5/2011 | Berkes et al. | |
| 2011/0185309 A1 | 7/2011 | Challinor et al. | |
| 2011/0190061 A1 | 8/2011 | Takeda et al. | |
| 2011/0193939 A1 | 8/2011 | Vassigh et al. | |
| 2011/0230263 A1 | 9/2011 | Ng | |
| 2011/0300929 A1* | 12/2011 | Tardif et al. | 463/30 |
| 2012/0122574 A1 | 5/2012 | Fitzpatrick et al. | |
| 2013/0260864 A1 | 10/2013 | Gomez et al. | |
| 2013/0293586 A1 | 11/2013 | Kaino et al. | |

FOREIGN PATENT DOCUMENTS

| | | | |
|---|---|---|---|
| CN | 101380520 A | 3/2009 | |
| CN | 101505841 A | 8/2009 | |
| JP | H10504917 A | 5/1998 | |
| JP | H11-300049 A | 11/1999 | |
| JP | 2001-299975 A | 10/2001 | |
| JP | 2006-194887 A | 7/2006 | |
| JP | 2006-344199 A | 12/2006 | |
| JP | 2007236696 A | 9/2007 | |
| JP | 2008-178597 A | 8/2008 | |
| JP | 2009-061180 A | 3/2009 | |
| JP | 2010-137097 | 6/2010 | |
| JP | 2010-257461 A | 11/2010 | |
| JP | 2010258774 A | 11/2010 | |
| JP | 2010534895 A | 11/2010 | |
| JP | 2011-189066 | 9/2011 | |
| JP | 2012070781 A | 4/2012 | |
| JP | 2012-155654 A | 8/2012 | |
| KR | 1020010095900 A | 11/2001 | |
| KR | 10-2005-0047024 | 5/2005 | |
| KR | 10-2007-0032842 | 3/2007 | |
| KR | 1020080069601 A | 7/2008 | |
| KR | 10-2009-0090980 | 8/2009 | |
| KR | 10-2010-0032699 | 3/2010 | |
| KR | 1020110047776 A | 5/2011 | |

OTHER PUBLICATIONS

International Search Report and Written Opinion from International Application No. PCT/KR11/006430 mailed Apr. 30, 2012.
http://www.dooyoo.co.uk./playstation-2-game/eyetoy-play-camera/1017264/ (2012).
International Search Report and Written Opinion from International Application No. PCT/KR11/004855 mailed Apr. 4, 2012.
International Search Report and Written Opinion from International Application No. PCT/KR11/009324 mailed Aug. 31, 2012.
International Search Report and Written Opinion from International Application No. PCT/KR2011/006430 mailed Apr. 30, 2012.
http://www.dooyoo.co.uk/playstation-2-game/eyetoy-play-camera/1017264/.
Bee, J., "kinect fail," accessed at https://www.youtube.com/watch?v=qafmCU4LUZ8&feature=player_embedded, last Uploaded on Nov. 7, 2010, pp. 3.

* cited by examiner (A)

(B)

(A)    (B)

POSITION-SETUP FOR GESTURE-BASED GAME SYSTEM

CROSS-REFERENCE TO RELATED APPLICATIONS

The present application is a U.S. national phase application under 35 U.S.C §371 of International Application No. PCT/KR2011/006430, filed on Aug. 31, 2011.

BACKGROUND ART

Camera technology and gesture recognition technology have experienced phenomenal growth in the last few years. Game devices have adopted such technologies. For example, a game device may recognize a gesture of a player using a camera and use the recognized gesture of the player as an input signal for playing a game. Game software developers have developed various types of gesture-based games for such game devices. Players can play the gesture-based games using their gestures (without using a keypad-type input device). However, multiple players of a gesture-based game may be adjacent to each other and may collide with each other while playing the game.

DISCLOSURE OF INVENTION

Solution to Problem

In an example, a method performed under control of a gesture-based game system may include capturing, by an image capture unit, an image of a first player and an image of a second player, cropping, from the image of the first player and the image of the second player, a first sub-image of at least part of the first player and a second sub-image of at least part of the second player, respectively, determining whether to adjust the first sub-image and the second sub-image, if it is determined to adjust the first sub-image and second sub-image, adjusting the first sub-image and the second sub-image, and merging the first adjusted sub-image and the second adjusted sub-image into an output image.

In an example, a position-setup component for a gesture-based game system may include a cropping unit configured to crop, from an image of a first player and an image of a second player, a first sub-image of at least part of the first player and a second sub-image of at least part of the second player, respectively, an adjusting unit configured to adjust the first sub-image and the second sub-image, a merging unit configured to merge the first adjusted sub-image and the second adjusted sub-image into an output image, and a player position determination unit configured to determine whether the first player and the second player are positioned at a first preset position and a second preset position, respectively.

In an example, a computer-readable storage medium may have stored thereon computer-executable instructions that, in response to execution, cause a position-setup component for a gesture-based game system to perform operations including cropping from an image of a first player and an image of a second player, a first sub-image of at least part of the first player and a second sub-image of at least part of the second player, respectively, determining whether to adjust the first sub-image and the second sub-image, if it is determined to adjust the first sub-image and second sub-image, adjusting the first sub-image and the second sub-image, and merging the first adjusted sub-image and the second adjusted sub-image into an output image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
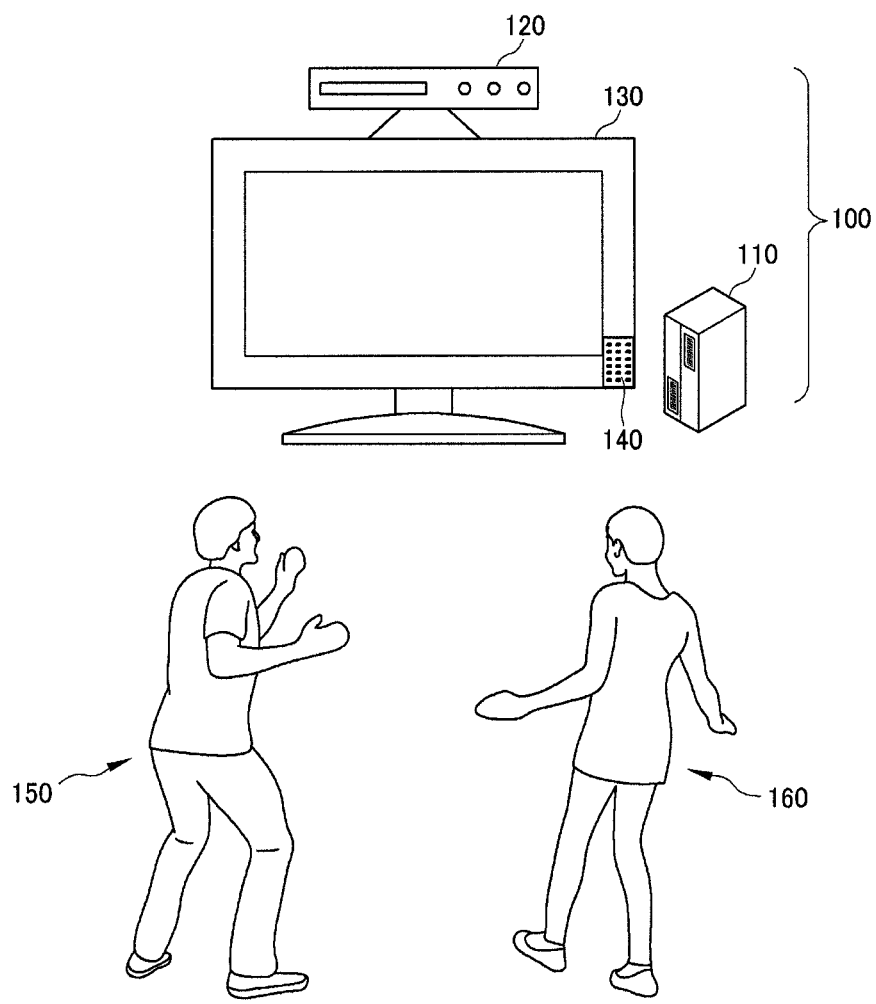
FIG. 1 schematically shows an illustrative example of an environment where multiple players play a gesture-based game on a gesture-based game system.

all arranged in accordance with at least some embodiments described herein.

MODE FOR THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a position-setup scheme for gesture-based game systems.

Briefly stated, technologies are generally described for a gesture-based game system configured to provide players of a gesture-based game with information on positions where the players can play the gesture-based game while reducing the risk of collision with each other. In some examples, the gesture-based game system may provide the players with an output image for guiding the players to respective preset positions. By way of example, but not limitation, the output image may include images or guidelines suggesting to the players moving to their respective preset positions. Each of the players may move to or be positioned at the respective preset positions by using the provided output image. The players may move to be displaced by a certain distance from each other based on the provided output image, so that the players can play the gesture-based game while reducing the risk of collision between the players.

In some examples, the gesture-based game system may provide the players with multiple guidelines for guiding the players to the respective preset positions, in addition to the output image. The players may move to or be positioned at the respective preset positions by using the provided guidelines.

In some examples, an alarm or alert may be generated if at least one of the players strays from his/her preset position while playing the gesture-based game. As will be further described, the relative positioning of the players may be based, at least in part, on various factors such as, but not limited to, number of players, type of game (e.g., boxing, running, etc.), environment of the play area (e.g., absence or presence of obstacles), play area illumination, and so forth.

FIG. 1 schematically shows an illustrative example of an environment where multiple players may interact with a gesture-based game in accordance with at least some embodiments described herein. Although FIG. 1 illustrates two players, it is noted that any number of players can play the gesture-based game together.

As depicted in FIG. 1, a first player 150 and a second player 160 may interact with a gesture-based game running on a gesture-based game system 100. The gesture-based game may be played by recognizing gestures of first player 150 and second player 160. By way of example, but not limitation, the gesture-based game may include a dancing game, a boxing game, a tennis game, and the like, and the claimed subject matter is not limited in this respect.

In some embodiments, gesture-based game system 100 may include a game console 110, an image capture unit such as a camera 120, a display 130 and an audio device 140. Game console 110 may facilitate execution of a gesture-based game. Although illustrated as discrete components, various components of gesture-based game system 100 may be divided into additional components, combined into fewer components, or eliminated, depending on the various implementations, and are not limited in this respect. For example, camera 120 may be included as a component of the game console 110.

Game console 110 may be configured to run or execute the gesture-based game. By way of example, but not limitation, when first player 150 or second player 160 inserts a game, such as, but not limited to, a game compact disc (CD) or a game digital versatile disk (DVD) of the gesture-based game into game console 110, game console 110 may execute the gesture-based game.

Camera 120 may be configured to detect or recognize persons within a predetermined detectable area (e.g., field of view of camera 120) including recognition of first player 150 and second player 160 of the game running on game console 110. Camera 120 may be one of a set of input devices of gesture-based game system 100. In some embodiments, camera 120 may detect a movement of first player 150 and second player 160 and transmit the detected movement, as an electrical signal, to game console 110. By way of example, but not limitation, camera 120 may include, but not limited to, a camera capable of determining depth, facial recognition, gesture recognition, and may even include a microphone for audio and/or voice recognition. Accordingly, camera 120 may include a wide variety of imaging devices which may have the capability of recognizing first player 150 and second player 160 and/or recognizing their gestures, and so forth.

Display 130 may be configured to display the gesture-based game. In some embodiments, display 130 may display at least one game character, which makes gestures in the gesture-based game follow gestures that at least one of first player 150 and second player 160 makes. By way of example, but not limitation, if camera 120 detects a forward movement of first player 150, a first game character corresponding to first player 150 may also be displayed as being moved forward, and if camera 120 detects an upward movement of an arm of second player 160, an arm of a second game character corresponding to second player 160 may also be displayed as being moved upward. Thus, first player 150 and second player 160 may respectively move in certain directions or move specific parts of their bodies in certain directions while watching their own game characters displayed on display 130. This type of game character interaction may be referred to as an avatar. By way of example, display 130 may include, but is not limited to, a liquid crystal display (LCD), a plasma display panel (PDP), a light emitting diode (LED) backlight display device, or other display device, and is not limited in this respect.

Audio device 140 may be one example of output devices of gesture-based game system 100. Audio device 140 may be configured to output background music or sound effects of the gesture-based game. Audio device 140 may be provided as a part of display 130 as shown in FIG. 1 or as a separate device.

Game console 110 in accordance with at least some embodiments described herein may include a position-setup component configured to set preset positions of first player 150 and second player 160 so as to aid in reducing the risk of collision between first player 150 and second player 160 during playing the gesture-based game, in accordance with various embodiments.

Figure 2:
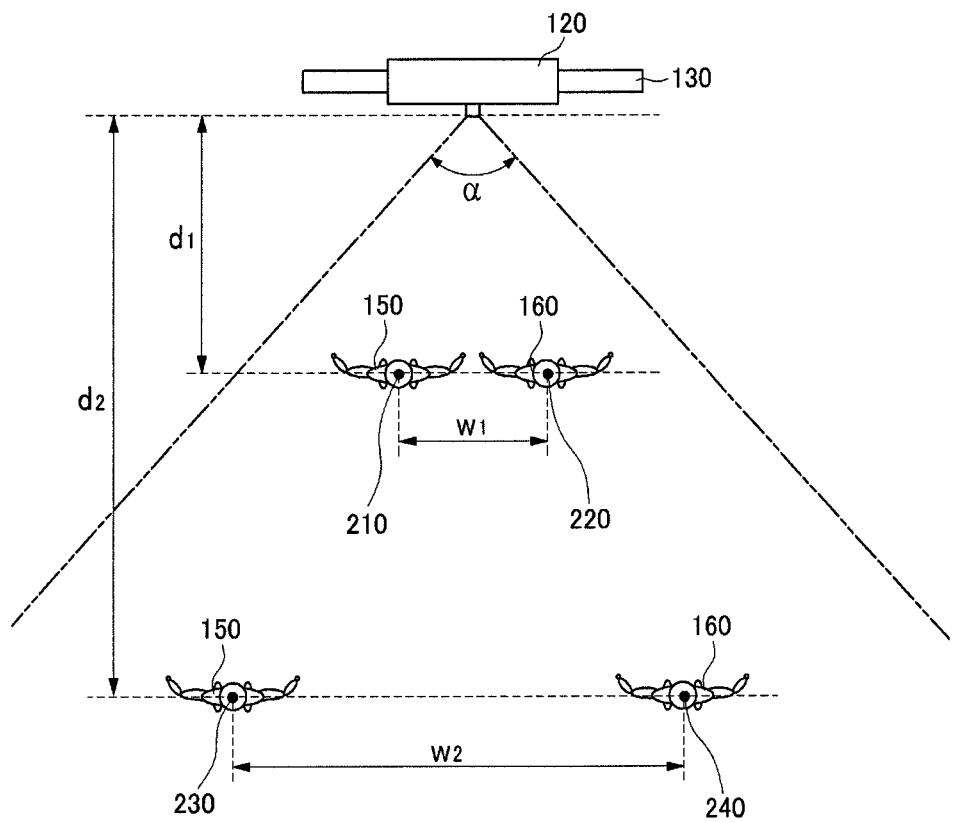
FIG. 2 schematically shows an illustrative example of an environment where multiple players interact with a gesture-based game system.

FIG. 2 schematically shows an illustrative example of an environment where multiple players interact with a gesture-based game system in accordance with at least some embodiments described herein. Although FIG. 2 illustrates that two players may interact with the gesture-based game system, it is noted that any number of players can play the gesture-based game together (i.e., any number of players may interact with the gesture-based game system).

As depicted in FIG. 2, since a viewing angle α that can be covered by camera 120 is less than 180 degrees, camera 120 may recognize relatively narrow range in cases where the players are located close to camera 120. However, camera 120 may also recognize relatively wide range in cases where the players are located far from camera 120. Thus, in cases where the distance between camera 120 and the players are short, the players may be located adjacent relative to each other.

By way of example, but not limitation, in cases where the players, first player 150 and second player 160, are displaced by distance d1 from camera 120 as depicted in FIG. 2, first player 150 and second player 160 may be located, e.g., at positions 210 and 220. That is, first player 150 and second player 160 may be located relatively close to each other displaced by distance w1 from each other. In such cases, there may be a risk that first player 150 and second player 160 may collide with each other while playing the gesture-based game. On the other hand, in cases where the players are displaced by distance d2 from camera 120, first player 150 and second player 160 may be located relatively far from each other with each player being displaced by distance w2 from each other, e.g., at positions 230 and 240, respectively. In such cases, a risk of a collision between first player 150 and second player 160 may be reduced. However, as previously alluded to, distances may also be based, at least in part, on various factors such as, but not limited to, the type of game (e.g., boxing—relative distance not far from each player; sword game—relative distance relatively far from each other).

Figure 3:
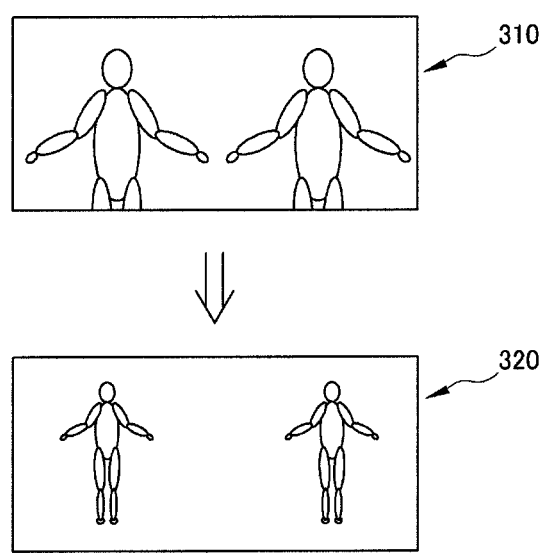
FIG. 3 shows illustrative examples of images captured by a camera of a gesture-based game system.
Figure 4:
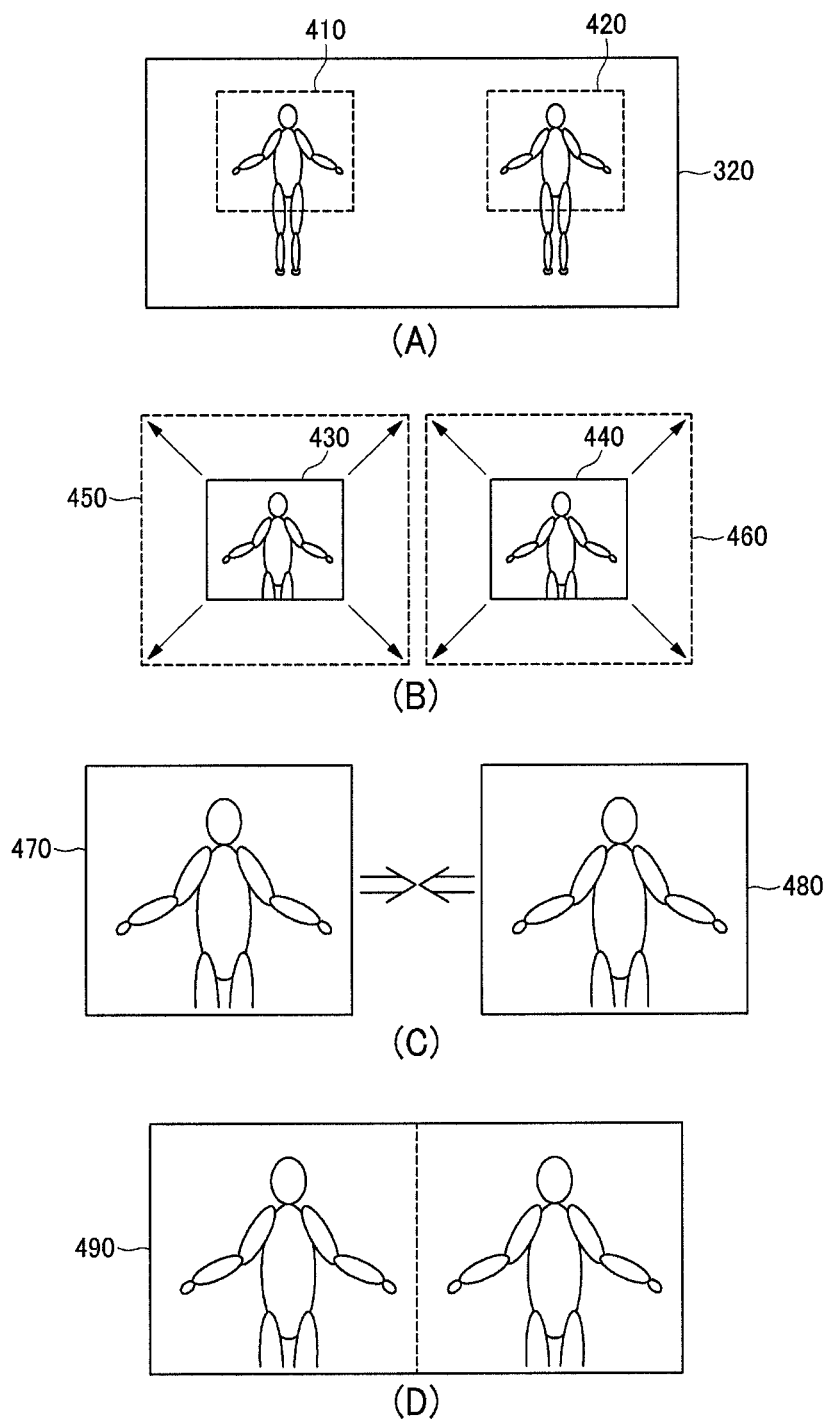
FIGS. 4(A)-(D) show an illustrative example of a process for generating an output image.

FIG. 3 shows illustrative examples of images captured by a camera of a gesture-based game system in accordance with at least some embodiments described herein. By way of example, but not limitation, a first image 310 may correspond to an image which camera 120 captures from first player 150 and second player 160, respectively, located at positions 210 and 220 as in FIG. 2. A second image 320 may correspond to an image which camera 120 captures from first player 150 and second player 160 respectively located at positions 230 and 240 as in FIG. 2.

Since positions 230 and 240 may be relatively farther from camera 120 than positions 210 and 220, image sizes of first player 150 and second player 160 in second image 320 may be relatively smaller than those in first image 310. By way of example, but not limitation, when first player 150 and second player 160 are respectively located at positions 230 and 240, in order to reduce a risk of collision, second image 320 may be presented to first player 150 and second player 160.

FIGS. 4(A)-(D) show an illustrative example of a process for generating an output image in accordance with at least some embodiments described herein.

As depicted in FIG. 4(A), preset areas 410 and 420 may be cropped from image 320 captured by camera 120, and a first sub-image 430 and a second sub-image 440 depicted in FIG. 4(B) may be generated from cropped areas 410 and 420, respectively. In some embodiments, areas to be cropped from image 320 may be determined based, at least in part, on preset positions of first player 150 and second player 160.

As depicted in FIG. 4(B), first sub-image 430 and second sub-image 440 generated from preset areas 410 and 420 may be adjusted by a first predetermined rate and a second predetermined rate, respectively. By way of example, but not limitation, first sub-image 430 and second sub-image 440 may be enlarged to predetermined sizes 450 and 460, respectively.

In some embodiments, the first and second predetermined rates, by which first sub-image 430 and second sub-image 440 are respectively adjusted, may be associated with the preset positions of first player 150 and second player 160. In some embodiments, the first and second predetermined rates may be determined depending on a difference between sizes of cropped areas 410 and 420 and a size of an output image 490 shown in FIG. 4(D) to be presented to first player 150 and second player 160. Accordingly, this adjustment may be based, at least in part, on a more convenient size of the image of the players on the display for playing the game (i.e., too small or too large). As previously mentioned, convenient size of the image may be based, at least in part, on various factors.

An adjusted first sub-image 470 and an adjusted second sub-image 480, which are adjusted from first sub-image 430 and second sub-image 440, respectively, may be merged with each other as depicted in FIG. 4(C) resulting in an output image 490 depicted in FIG. 4(D). In some embodiments, the size of output image 490 generated by merging adjusted first sub-image 470 and adjusted second sub-image 480 may be the same as a size of image 320. By way of example, but not limitation, sizes of images of first player 150 and second player 160 rendered in output image 490 may be greater than those in image 320.

Figure 5:
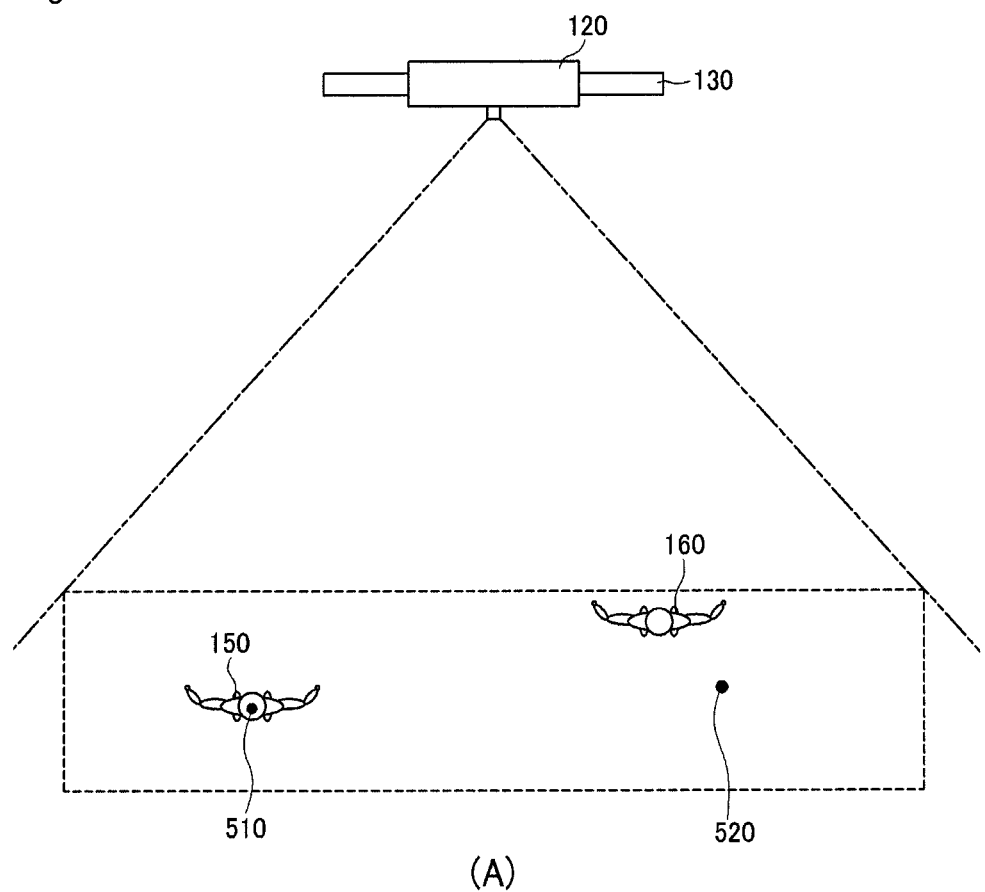
FIG. 5(A) schematically shows an illustrative example of an environment where two players interact with a gesture-based game system.
FIG. 5(B) shows an illustrative example of an output image in cases where two players are located as in FIG. 5(A)
Figure 5:
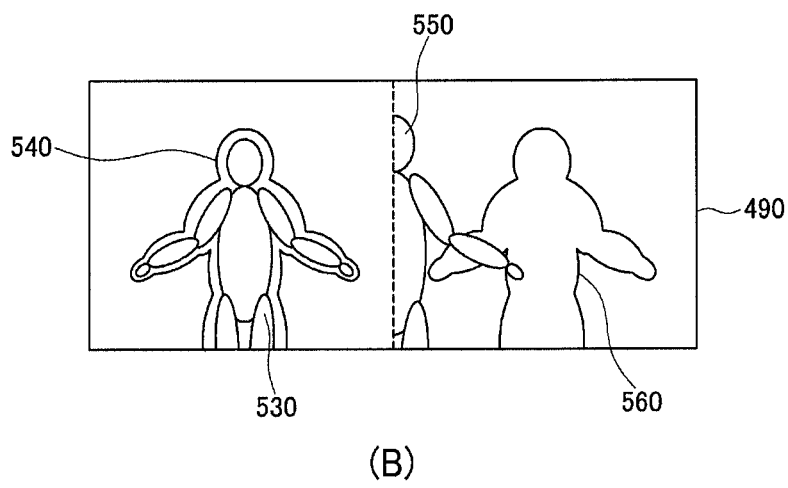

FIG. 5(A) schematically shows an illustrative example of an environment where two players interact with a gesture-based game system in accordance with at least some embodiments described herein. FIG. 5(B) shows an illustrative example of an output image in cases where two players are located as in FIG. 5(A). Although FIGS. 5(A)-(B) illustrate two players, it should be appreciated by one skilled in the relevant art that any number of players may interact with the gesture-based game together (i.e., any number of players may interact with the gesture-based game system).

In some embodiments, a preset position may be preset for each of players. By way of example, but not limitation, a first preset position 510 may be set in advance for first player 150, and a second preset position 520 may be set in advance for second player 160. When first player 150 and second player 160 are respectively located at their preset positions, first preset position 510 and second preset position 520, first player 150 and second player 160 may interact with a gestured-based game. However, as will be described, first player 150 and second player 160 may not interact with the game because of second player 160 not being in second preset position 520. In some embodiments, guidelines may be displayed along with an output image. By way of example, but not limitation, a first guideline 540 may be displayed for first player 150, and a second guideline 560 may be displayed for second player 160. In such cases, each of the players may determine whether he/she is located at his/her preset position by reference to the guideline provided therefor.

In some embodiments, in cases where at least one of the players strays from his/her preset position, for example, second player 160 strays from second preset position 520 as depicted in FIG. 5(A), output image 490 depicted in FIG. 5(B) may be presented to first player 150 and second player 160, where an image 530 of first player 150 is shown inside first guideline 540, whereas an image 550 of second player 160 is shown outside or overlapped with second guideline 560. In such cases, second player 160 may move to his/her preset position, i.e., second preset position 520, by reference to second guideline 560.

Figure 6:
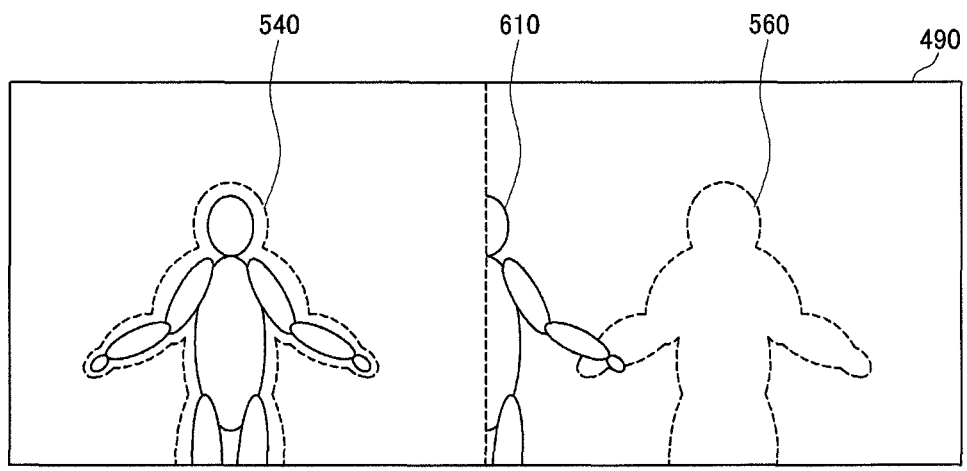
FIG. 6 shows an illustrative example of an output image in cases where at least one player strays from his/her preset position while interacting with a gesture-based game system.

FIG. 6 shows an illustrative example of an output image in cases where at least one player strays from his/her preset position while interacting with a gesture-based game system in accordance with at least some embodiments described herein. Although FIG. 6 illustrates that first guideline 540 and second guideline 560 are displayed on or together with output image 490, it is noted that first guideline 540 and second guideline 560 may disappear and/or may not be displayed on or together with output image 490.

In some embodiments, in cases where a second player strays from his/her own preset position, as depicted in FIG. 6, while interacting with the gesture-based game system, an image 610 of the second player may also stray from second guideline 560 which is displayed with output image 490. In some embodiments, in cases where it is determined that the second player strays from a preset position while interacting with the gesture-based game system, an alarm may be generated by way of a warning.

In some embodiments, whether a player strays from his/her own preset position may be determined based on whether the player moves a predetermined distance from his/her own preset position. As previously described, positioning may be based, at least in part, on various factors.

Figure 7:
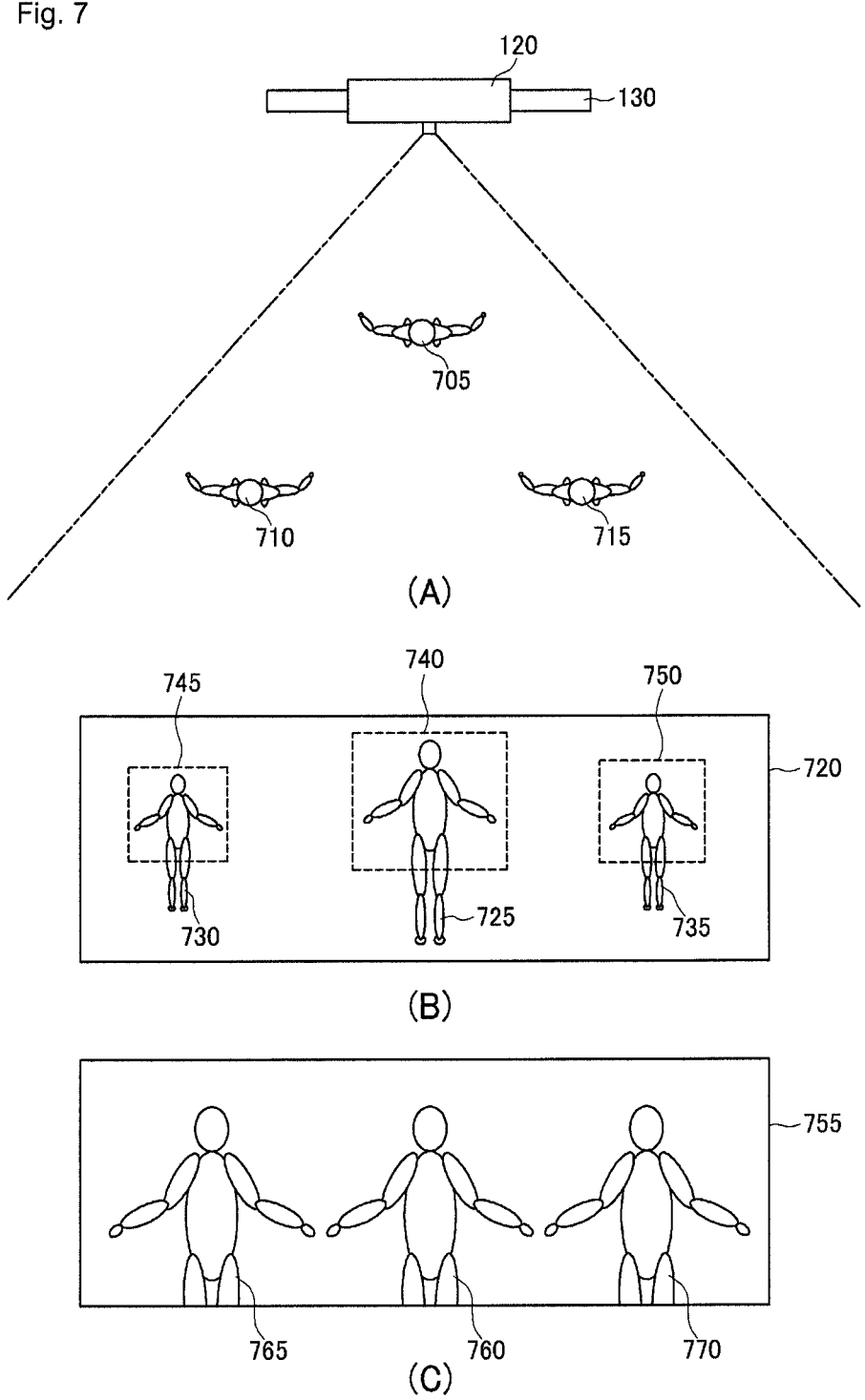
FIG. 7(A) shows an illustrative example of an environment where three players interact with a gesture-based game system.
FIG. 7(B) shows an illustrative example of an image in cases where three players interact with a gesture-based game system as in FIG. 7(A)
FIG. 7(C) shows an illustrative example of an output image in cases where three players interact with a gesture-based game system as in FIG. 7(A)

FIG. 7(A) shows an illustrative example of an environment where three players interact with a gesture-based game system in accordance with at least some embodiments described herein, and FIGS. 7(B)-(C) respectively show illustrative examples of images and output images in cases where three players interact with the gesture-based game system as in FIG. 7(A). Although FIGS. 7(A)-(C) illustrate that three players interacting with the gesture-based game system, it is noted that any number of players may interact with the gesture-based game system together, and the claimed subject matter is not limited in this respect (i.e., a gesture-based game may allow several players at once).

In some embodiments, three players, e.g., a first player 705, a second player 710 and a third player 715, may be located at respective preset positions to interact with a gesture-based game system. By way of example, but not limitation, first player 705 may be located closer to camera 120 than second player 710 and third player 715, as in FIG. 7(A). One skilled in the art will appreciate that any arrangement or disposition of the preset positions may also be applicable.

As depicted in FIG. 7(B), in cases where the players are located as in FIG. 7(A), an image 725 of first player 705 in an image 720 may be larger than an image 730 of second player 710 in image 720. Thus, size of a cropped area 740, a first sub-image corresponding to first player 705 may be different from size of a cropped area 745, a second sub-image corresponding to second player 710. Similarly, image 725 of first player 705 in image 720 may be larger than an image 735 of third player 715 in image 720. Thus, the size of cropped area 740, the first sub-image may be different from size of a cropped area 750, a third sub-image corresponding to third player 715.

In some embodiments, the first, second and third sub-images may be enlarged with predetermined enlargement rates as previously described. In some embodiments, the enlargement rates for the first, second and third sub-images may be different from one another. By way of example, but not limitation, a first predetermined enlargement rate applied to the first sub-image, which is cropped from image 720, may be smaller than a second predetermined enlargement rate. A third predetermined enlargement rate may be applied to the second sub-image and the third sub-image. In such cases, even if sizes of cropped images for the respective players are different from one another (i.e. even if the sizes of the sub-images of the respective players cropped from image 720 are different from one another) sizes of images 760, 765 and 770 for the respective players in an output image 755 may be the same, as depicted in FIG. 7(C).

Figure 8:
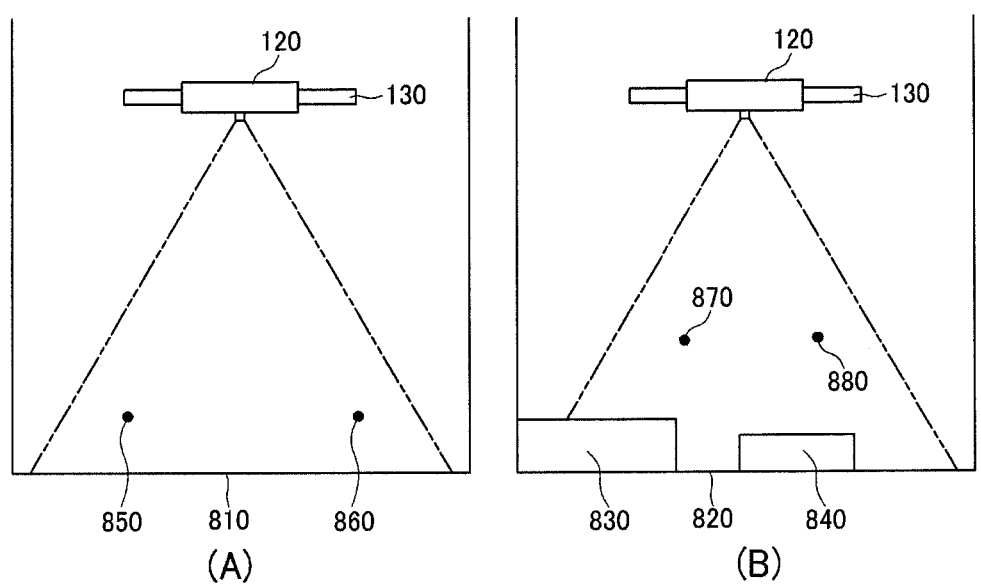
FIGS. 8(A)-(B) show illustrative examples of environments where preset positions of players are determined based on an available playing area.

FIGS. 8(A)-(B) show illustrative examples of environments where preset positions of players may be determined based on an available playing area in accordance with at least some embodiments described herein. Specifically, FIG. 8(A) shows an example room 810 where there may not be an obstacle to playing a gesture-based game, and FIG. 8(B) shows an example room 820 where there may be obstacles 830 and 840 to playing the gesture-based game. As depicted, an available playing area in room 810 may be larger than an available playing area of room 820. In such cases, a first preset position 850 and a second preset position 860 set in room 810 may be farther from camera 120 than a first preset position 870 and a second preset position 880 set in room 820. In some embodiments, a distance between first preset position 850 and second preset position 860 set in room 810 may be greater than a distance between first preset position 870 and second preset position 880 set in room 820. It should be appreciated by one skilled in the relevant art that even though the claimed subject matter may have been described with respect to what may be referred to as a field of view in a horizontal direction, it is contemplated within the scope of the disclosure that the claimed subject matter may be equally applicable with respect to what may be referred to as a vertical field of view and any combination thereof.

Figure 9:
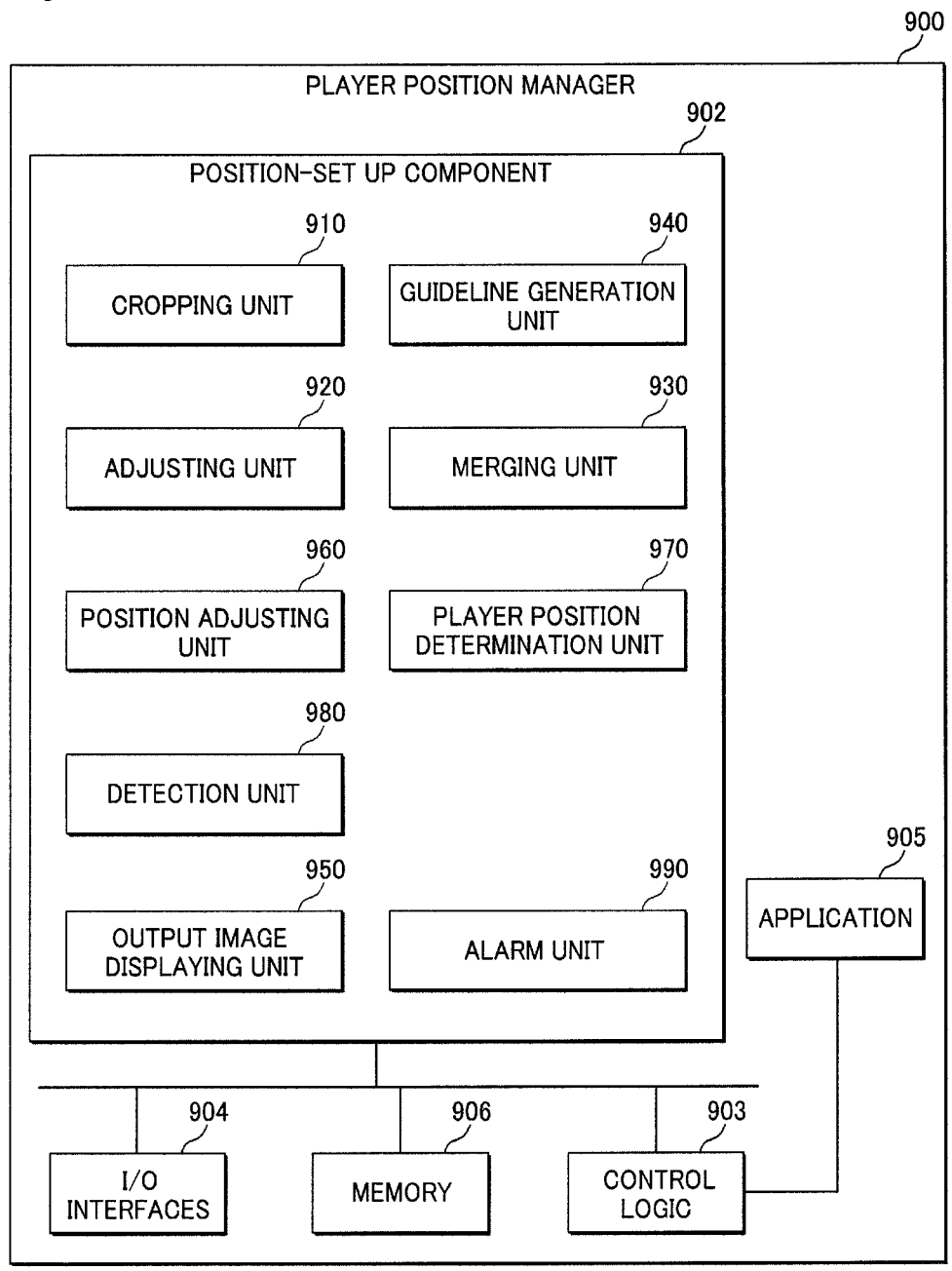
FIG. 9 shows a schematic block diagram illustrating an example architecture for a player position manager for a gesture-based game system.

FIG. 9 shows a schematic block diagram illustrating an example architecture for a player position manager 900 which may be included in gesture-based game system 100 in accordance with at least some embodiments described herein. As previously alluded to, player position manager 900 may be included as a component to various gesture-based game systems such, but not limited to, a component of image capture unit such as camera 120, included as a component of display 130, included as a component of game console 110, etc., or any combination thereof.

The example player position manager 900 may include a position-set up component 902. Player position manager 900 may also include control logic 903, input/output (I/O) interfaces 904, one or more applications 905, and memory 906. As illustrated, position-set up component 902 may be communicatively coupled to control logic 903, memory 906, and I/O interfaces 904. As depicted, position-setup component 902 may include a cropping unit 910, an adjusting unit 920, a merging unit 930, a guideline generation unit 940, an output image displaying unit 950, a position adjusting unit 960, a player position determination unit 970, a detection unit 980 and an alarm unit 990. Although illustrated as discrete components, various components may be divided into additional components, combined into fewer components, or eliminated, and accordingly, the claimed subject matter is not limited in this respect.

In some examples, the example architecture illustrated in FIG. 9 may be configured to support or enable player position manager 900 as described herein. It should be appreciated that for the claimed subject matter, player position manager 900 may include some, all, or more than those depicted in FIG. 9.

In some examples, control logic 903 may be configured to control the overall operation of player position manager 900. For example, control logic 903 may represent any of a wide variety of logic device(s) configured to operate in conjunction with executable content or instructions to implement the control of player position manager 900. For example, control logic 903 may separately or collectively represent a wide variety of logic device(s) to implement the various features of player position manager 900. An example logic device may include one or more of a computer, a microprocessor, a microcontroller, a field programmable gate array (FPGA), an application specific integrated circuit (ASIC), a sequestered thread or a core of a multi-core/multi-threaded microprocessor or any combination thereof. In some alternate examples, features and functionality of control logic 903 may be implemented within position-set up component 902.

According to some examples, memory 906 may be arranged to store executable content or instructions. Executable content or instructions may be utilized by control logic 903 and/or position-set up component 902 to implement or activate features of player position manager 900. Memory 906 may also be arranged to at least temporarily maintain information associated with adjustment of images (e.g., adjustment of images at predetermined rates).

Memory 906 may include a wide variety of memory media including, but not limited to, one or more volatile memory, non-volatile memory, flash memory, programmable variables, or states, random access memory (RAM), read-only memory (ROM), or other static or dynamic storage media.

In some examples, I/O interfaces 904 may provide an interface via an internal communication medium or link between a player position manager 900 and elements and/or units resident on or co-located with player position manager 900. For example, I/O interfaces 904 may provide a communicative interface for camera 120, display 130, audio device 140, game console 110, and/or any combination thereof. Here again, it should be appreciated by one skilled in the relevant art that the player position manager 900 may be included as a component to various gesture-based game systems such, but not limited to, a component of image capture unit such as camera 120, included as a component of display 130, included as a component of game console 110, etc., or any combination thereof.

Reference is now made to the individual units included in the position-set up component 902. Cropping unit 910 may be configured to crop from an image of multiple players including, for example, a first player and a second player to generate multiple sub-images including, for example, a first sub-image of at least part of the first player and a second sub-image of at least part of the second player. In some embodiments, cropping unit 910 may generate the first sub-image and the second sub-image in a first predetermined size and a second predetermined size, respectively. In some embodiments, the first predetermined size and the second predetermined size may be associated with a first preset position for the first player and a second preset position for the second player, respectively.

Adjusting unit 920 may be configured to adjust or modify sizes of the sub-images generated by cropping unit 910. By way of example, but not limitation, adjusting unit 920 may adjust the sizes of first sub-image corresponding to the first player and the second sub-image corresponding to the second player.

In some embodiments, adjusting unit 920 may enlarge the first sub-image at a first enlargement rate and the second sub-image at a second enlargement rate. In some embodiments, the first enlargement rate and the second enlargement rate may be associated with the first preset position and the second preset position, respectively. In some embodiments, the first enlargement rate and the second enlargement rate may be associated with a number of players interacting with the gesture-based game system (i.e., number of players for the gesture-based game). However, as previously alluded to, there may be instances where adjustment may not occur due to convenient size associated with displayed image of the players.

Merging unit 930 may be configured to generate an output image by merging the sub-images adjusted by adjusting unit 920. By way of example, but not limitation, merging unit 930 may merge the first adjusted sub-image and the second adjusted sub-image to generate the output image.

Guideline generation unit 940 may be configured to generate a first guideline associated with the first preset position and a second guideline associated with the second preset position. By way of example, but not limitation, the first guideline and the second guideline generated by guideline generation unit 940 may be displayed on display 130 together with the output image generated by merging unit 930.

Output image displaying unit 950 may be configured to display the output image on display 130. In some embodiments, output image displaying unit 950 may also be configured to display the first guideline and the second guideline generated by guideline generation unit 940 on display 130.

Position adjusting unit 960 may be configured to adjust at least one of the first preset position and the second preset position. By way of example, but not limitation, position adjusting unit 960 may determine an available playing area for the gesture-based game and update at least one of the first preset position and the second preset position based on the determined available playing area.

In some embodiments, the first preset position and the second preset position may be set in advance, for example, as default preset positions. In such cases, if the available playing area is larger or wider than a predetermined area of space, that is, if a larger or wider space is available for playing the gesture-based game than a presupposed available space corresponding to the default preset positions, position adjusting unit 960 may update at least one of the first preset position and the second preset position so as to be farther from each other. On the other hand, if the available playing area is smaller than the predetermined area of space, that is, if a smaller space is available for playing the gesture-based game than the presupposed available space corresponding to the default preset positions, position adjusting unit 960 may update at least one of the first preset position and the second preset position such that the first player and the second player do not collide with each other in the available playing area.

Player position determination unit 970 may be configured to determine whether the first player and the second player are positioned at the first preset position and the second preset position, respectively. In some embodiments, when player position determination unit 970 determines that the first player and the second player are positioned at the first preset position and the second preset position, respectively, the gesture-based game may start to be played.

Detection unit 980 may be configured to detect a movement of the first player and/or the second player. In some embodiments, detection unit 980 may determine, during a playing of the gesture-based game, whether at least one of the first player and the second player strays from the respective preset positions. By way of example, but not limitation, detection unit 980 may determine whether the first player moves from the first preset position by a first predetermined distance or the second player moves from the second preset position by a second predetermined distance.

Alarm unit 990 may be configured to generate an alarm or an alert upon the determination by detection unit 980 that at least one of the first player and the second player strays from his/her preset position. In some embodiments, alarm unit 990 may generate an audio alarm and/or a visual alarm.

Figure 10:
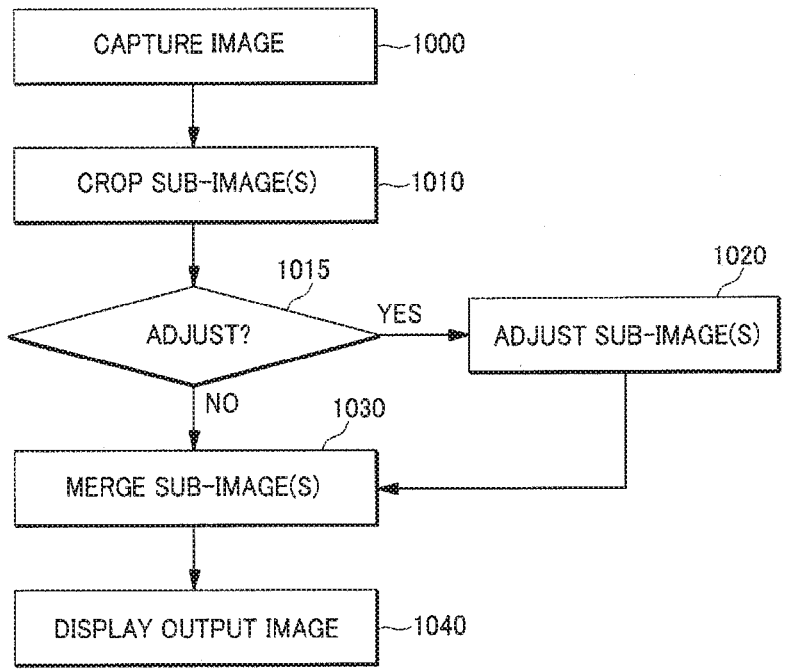
FIG. 10 shows an example flow diagram of a process for displaying an output image for position-setup.

FIG. 10 shows an example flow diagram of a process for displaying an output image for position-setup in accordance with at least some embodiments described herein. The method in FIG. 10 can be implemented in a gesture-based game system including a player position manager 900 including position-set up component 902 having cropping unit 910, adjusting unit 920, merging unit 930, guideline generation unit 940, output image displaying unit 950, position adjusting unit 960, player position determination unit 970, detection unit 980 and alarm unit 990 discussed above. An example process may include one or more operations, actions, or functions as illustrated by one or more blocks 1000, 1010, 1020, 1030 and/or 1040. Although illustrated as discrete blocks, various blocks may be divided into additional blocks, combined into fewer blocks, or eliminated, depending on the desired implementation. Processing may begin at block 1000.

At block 1000, the gesture-based game system may receive a captured image of two or more players. By way of example, but not limitation, the gesture-based game system may capture, by using camera 120, an image of a first player and a second player who interact with a gesture-based game. In some embodiments, the gesture-based game system may extract the image of a first player and the second player from other objects such as couch, lamp, etc. Processing may continue from block 1000 to block 1010.

At block 1010, the gesture-based game system may crop sub-images of at least part of the players from the image. By way of example, but not limitation, the gesture-based game system may crop from the image a first sub-image of at least part of the first player and a second sub-image of at least part of the second player.

In some embodiments, the gesture-based game system may crop the first sub-image and the second sub-image in a first predetermined size and a second predetermined size, respectively. By way of example, but not limitation, the first predetermined size and the second predetermined size may be associated with a first preset position and a second preset position, respectively. Processing may continue from block 1010 to block 1020.

At block 1015, the gesture-based game system may make a determination whether to adjust the sub-images. As previously described, if it is determined that the sub-images should be adjusted, in some embodiments, the gesture-based game system may enlarge the first sub-image and the second sub-image at a first predetermined enlargement rate and a second predetermined enlargement rate, at block 1020. By way of example, but not limitation, the first predetermined enlargement rate and the second predetermined enlargement rate may be associated with the first preset position and the second preset position, respectively. Processing may continue from block 1020 to block 1030. However, if it is determined that the sub-images should not be adjusted, processing may continue to merge the sub-images at block 1030.

At block 1030, the gesture-based game system may merge the sub-images adjusted at block 1020. Alternatively, at block 1030, gesture-based game system may merge images which were not adjusted. By way of example, but not limitation, the gesture-based game system may merge the first adjusted sub-image and the second adjusted sub-image into an output image. Processing may continue from block 1030 to block 1040.

At block 1040, the gesture-based game system may display the output image generated at block 1030. By way of example, but not limitation, the gesture-based game system may display the output image merged from the first adjusted sub-image and the second adjusted sub-image on display 130.

In some embodiments, the gesture-based game system may generate guidelines associated with the preset positions and display the generated guidelines on display 130. By way of example, but not limitation, the gesture-based game system may generate a first guideline associated with the first preset position and a second guideline associated with the second preset position. The gesture-based game system may display the first guideline and the second guideline on display 130 with the output image.

Figure 11:
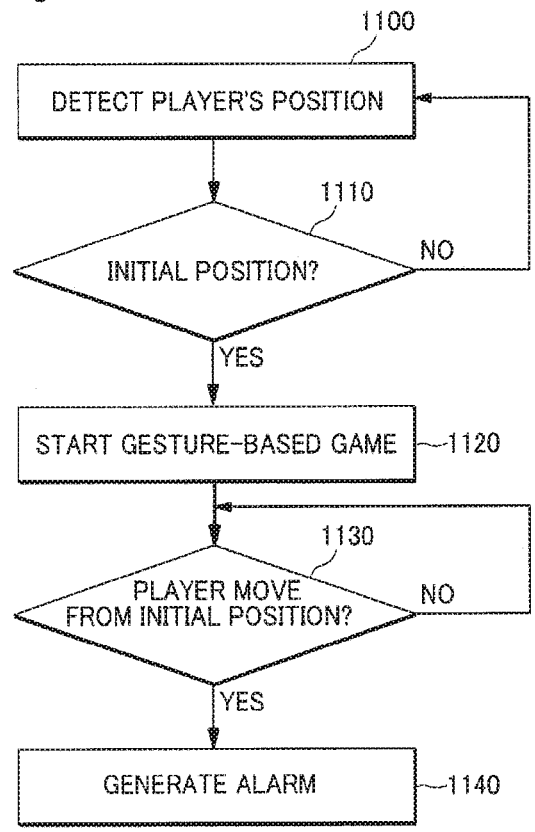
FIG. 11 shows an example flow diagram of a process for generating an alarm based on a player's movement.

FIG. 11 shows an example flow diagram of a process for generating an alarm based on a player's movement in accordance with at least some embodiments described herein. The method in FIG. 11 can be implemented using a gesture-based game system including a position-setup component 902 including cropping unit 910, adjusting unit 920, merging unit 930, guideline generation unit 940, output image displaying unit 950, position adjusting unit 960, player position determination unit 970, detection unit 980 and alarm unit 990 discussed above. An example process may include one or more operations, actions, or functions as illustrated by one or more blocks 1100, 1110, 1120, 1130 and/or 1140. Although illustrated as discrete blocks, various blocks may be divided into additional blocks, combined into fewer blocks, or eliminated, depending on the desired implementation. Processing may begin at block 1100.

At block 1100, the gesture-based game system may detect a position of one or more players. By way of example, but not limitation, the gesture-based game system may detect respective positions of a first player and a second player. Processing may continue from block 1100 to block 1110.

At block 1110, the gesture-based game system may determine whether the players are positioned at respective preset positions. By way of example, but not limitation, the gesture-based game system may determine whether the first player and the second player are positioned at a first preset position and a second preset position, respectively. In some embodiments, the gesture-based game system may determine whether the first player and the second player are positioned at the first preset position and the second preset position, respectively, based on an image of at least one of the first player and the second player. Processing may continue from block 1110 to block 1120.

At block 1120, the gesture-based game system may start a playing of a gesture-based game. By way of example, but not limitation, the gesture-based game system may start the playing of the gesture-based game upon determining that the first player and the second player are positioned at the first preset position and the second preset position, respectively. Processing may continue from block 1120 to block 1130.

At block 1130, the gesture-based game system may determine, during the playing of the gesture-based game, whether at least one of the players strays from the respective preset positions. By way of example, but not limitation, the gesture-based game system may determine, during the playing of the gesture-based game, whether at least one of the first player and the second player moves from his/her preset position. In some embodiments, the gesture-based game system may determine, during the playing of the gesture-based game, whether the first player moves from the first preset position by a first predetermined distance or the second player moves from the second preset position by a second predetermined distance. If the gesture-based game system determines that at least one of the players strays from the respective preset positions, processing may continue from block 1130 to block 1140.

At block 1140, the gesture-based game system may generate an alarm. By way of example, but not limitation, the generated alarm may include an audio alarm and/or a visual alarm.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
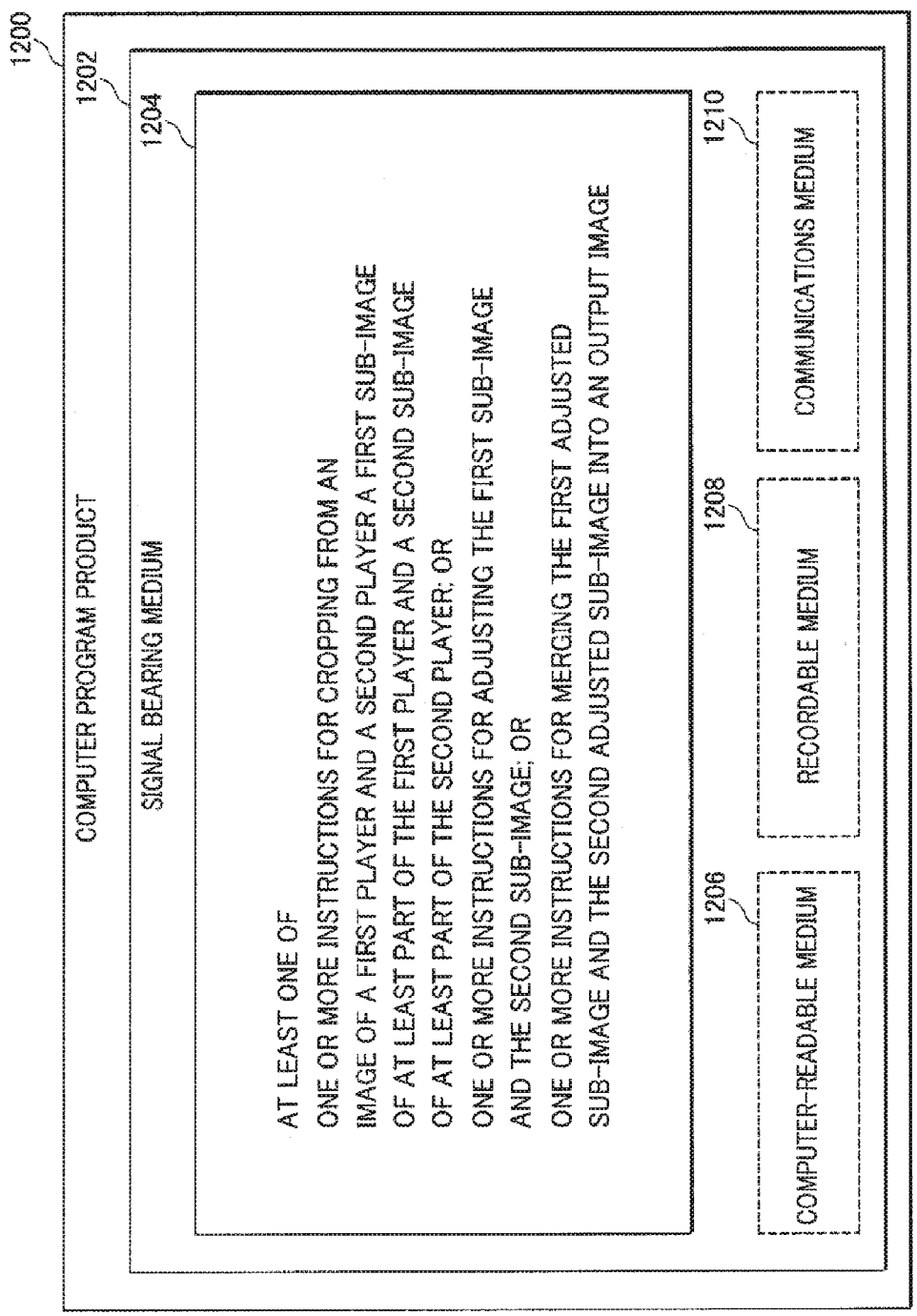
FIG. 12 illustrates computer program products that can be utilized to provide a position-setup scheme for a gesture-based game system.

FIG. 12 illustrates computer program products 1200 that can be utilized to provide a position-setup scheme for a gesture-based game system in accordance with at least some embodiments described herein. Computer program products 1200 may include a signal bearing medium 1202. Signal bearing medium 1202 may include one or more instructions 1204 that, when executed by, for example, a processor, may provide the functionality described above with respect to FIGS. 1-11. By way of example, instructions 1204 may include: one or more instructions for cropping from an image of a first player and a second player a first sub-image of at least part of the first player and a second sub-image of at least part of the second player; one or more instructions for adjusting the first sub-image and the second sub-image; one or more instructions for merging the first adjusted sub-image and the second adjusted sub-image into an output image. Thus, for example, referring to FIG. 9, position-setup component 902 may undertake one or more of the blocks shown in FIG. 10 in response to instructions 1204.

In some implementations, signal bearing medium 1202 may encompass a computer-readable medium 1206, such as, but not limited to, a hard disk drive, a CD, a DVD, a digital tape, memory, etc. In some implementations, signal bearing medium 1202 may encompass a recordable medium 1208, such as, but not limited to, memory, read/write (R/W) CDs, R/W DVDs, etc. In some implementations, signal bearing medium 1202 may encompass a communications medium 1210, such as, but not limited to, a digital and/or an analog communication medium (e.g., a fiber optic cable, a waveguide, a wired communications link, a wireless communication link, etc.). Thus, for example, computer program products 1200 may be conveyed to one or more modules of position-setup component 902 by an RF signal bearing medium 1202, where the signal bearing medium 1202 is conveyed by a wireless communications medium 1210 (e.g., a wireless communications medium conforming with the IEEE 802.11 standard).

Figure 13:
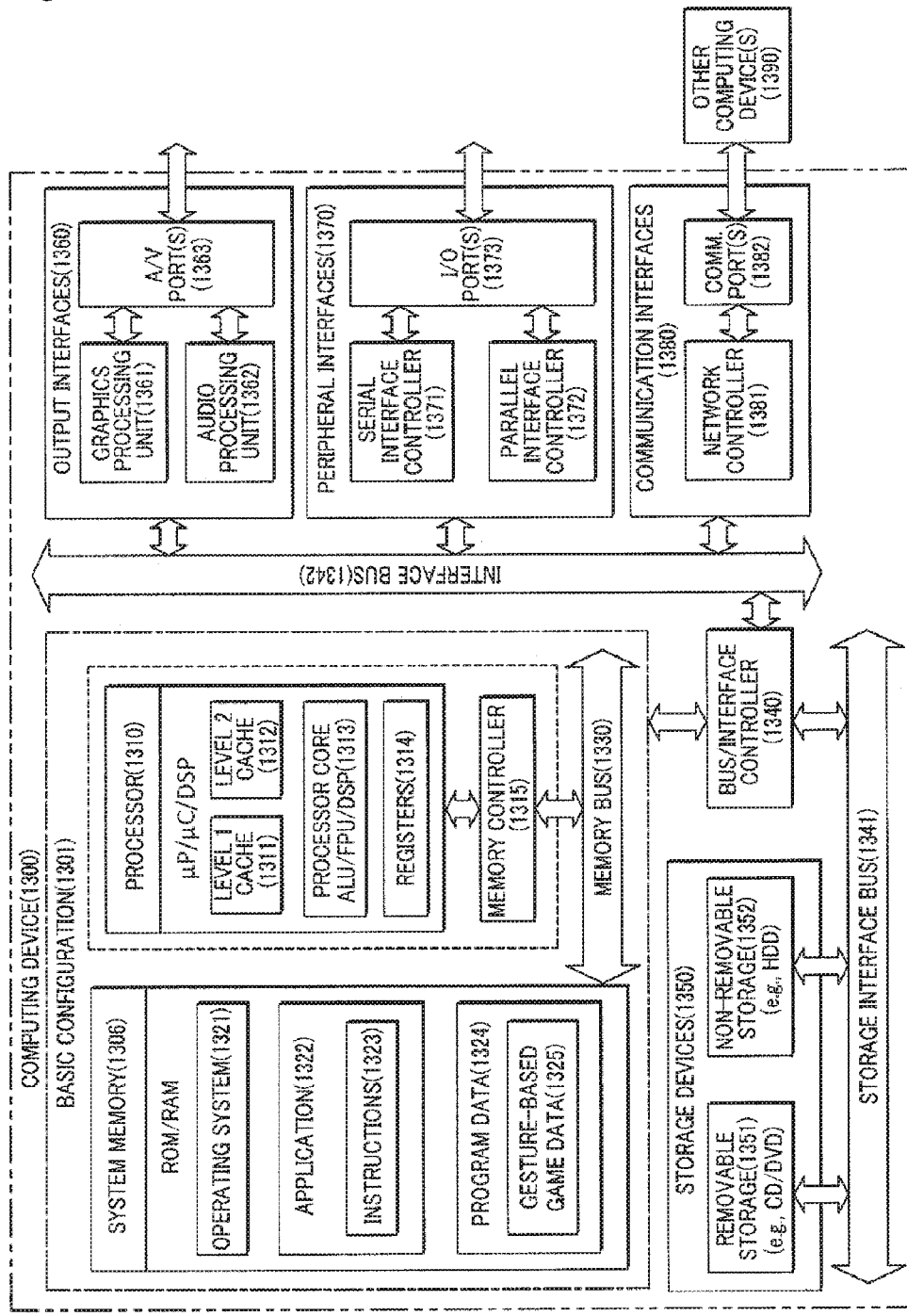
FIG. 13 is a block diagram illustrating an example computing device that can be utilized to provide a position-setup scheme for a gesture-based game system.

FIG. 13 is a block diagram illustrating an example computing device 1300 that can be utilized to provide a position-setup scheme for a gesture-based game system in accordance with at least some embodiments described herein. In these examples, elements of computing device 1300 may be arranged or configured for a gesture-based game system. In a very basic configuration 1301, computing device 1300 typically includes one or more processors 1310 and a system memory 1306. A memory bus 1330 may be used for communicating between processor 1310 and system memory 1306.

Depending on the desired configuration, processor 1310 may be of any type including but not limited to a microprocessor (μP), a microcontroller (μC), a digital signal processor (DSP), or any combination thereof. Processor 1310 may include one more levels of caching, such as a level one cache 1311 and a level two cache 1312, a processor core 1313, and registers 1314. An example processor core 1313 may include an arithmetic logic unit (ALU), a floating point unit (FPU), a digital signal processing core (DSP Core), or any combination thereof. An example memory controller 1315 may also be used with processor 1310, or in some implementations memory controller 1318 may be an internal part of processor 1310.

Depending on the desired configuration, system memory 1306 may be of any type including but not limited to volatile memory (such as RAM), non-volatile memory (such as ROM, flash memory, etc.) or any combination thereof. System memory 1306 may include an operating system 1321, one or more applications 1322, and program data 1324. Application 1322 may include instructions 1323 that may be arranged to perform the functions as described herein including the actions described with respect to the player position manager 900 architecture as shown in FIG. 9 or including the actions described with respect to the flow charts shown in FIGS. 10-11. Program data 1324 may include gesture-based game data 1325 that may be utilized for implementing instructions 1323 (e.g., player position management). In some examples, application 1322 may be arranged to operate with program data 1324 on an operating system 1321 such that implementations for instructions for a gesture-based game system as described herein.

Computing device 1300 may have additional features or functionality, and additional interfaces to facilitate communications between basic configuration 1302 and any required devices and interfaces. For example, a bus/interface controller 1340 may be used to facilitate communications between basic configuration 1302 and one or more data storage devices 1332 via a storage interface bus 1341. Data storage devices 1350 may be removable storage devices 1351, non-removable storage devices 1352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1306, removable storage devices 1351 and non-removable storage devices 1352 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1300. Any such computer storage media may be part of computing device 1300.

Computing device 1300 may also include an interface bus 1342 for facilitating communication from various interface devices (e.g., output interfaces 1360, peripheral interfaces 1370, and communication interfaces 1380) to basic configuration 1301 via bus/interface controller 1340. Example output interfaces 1360 include a graphics processing unit 1361 and an audio processing unit 1362, which may be configured to communicate to various external devices such as a display or speakers via one or more A/V ports 1363. Example peripheral interfaces 1370 include a serial interface controller 1371 or a parallel interface controller 1372, which may be configured to communicate with external devices such as input devices (e.g., keyboard, mouse, pen, voice input device, touch input device, etc.) or other peripheral devices (e.g., printer, scanner, etc.) via one or more I/O ports 1373. An example communication interface 1380 includes a network controller 1381, which may be arranged to facilitate communications with one or more other computing devices 1390 over a network communication link via one or more communication ports 1382.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1300 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a gesture-based game system, comprising:
   capturing, by an image capture unit, an image of a first player and an image of a second player;
   cropping, from the image of the first player and the image of the second player, a sub-image of at least part of the first player and a sub-image of at least part of the second player, respectively, in a first predetermined size and a second predetermined size based, respectively, at least in part on a preset position of the first player and a preset position of the second player;

determining whether to adjust the sub-image of at least part of the first player and the sub-image of at least part of the second player;

responsive to a determination to adjust the sub-image of at least part of the first player and the sub-image of at least a part of the second player, adjusting the sub-image of at least part of the first player and the sub-image of at least part of the second player; and merging the adjusted sub-image of at least part of the first player and the adjusted sub-image of at least part of the second player into an output image.

2. The method of claim 1, wherein the determining comprises determining if a size of the sub-image of at least part of the first player and a size of the sub-image of at least part of the second player are convenient for a gesture-based game based, at least in part, on an area on a display occupied by the sub-image of at least part of the first player and the sub-image of at least part of the second player.

3. The method of claim 1, further comprising:
determining whether the first player and the second player are positioned at the preset position of the first player and the preset position of the second player, respectively; and
starting play of a gesture-based game upon determining that the first player and the second player are positioned at the preset position of the first player and the second preset position of the second player, respectively.

4. The method of claim 3, wherein the adjusting includes:
enlarging the sub-image of at least part of the first player and the sub-image of at least part of the second player at a first predetermined enlargement rate and a second predetermined enlargement rate, respectively.

5. The method of claim 4, wherein the first predetermined enlargement rate and the second predetermined enlargement rate are associated with the preset position of the first player and the preset position of the second player, respectively.

6. The method of claim 3, further comprising:
generating a first guideline associated with the preset position of the first player and a second guideline associated with the preset position of the second player; and
displaying the first guideline and the second guideline on a display device.

7. The method of claim 3, further comprising:
determining, during the playing of the gesture-based game, whether the first player moves from the preset position of the first player by a first predetermined distance or the second player moves from the preset position of the second player by a second predetermined distance; and
generating an alarm upon determining that the first player moves from the preset position of the first player by the first predetermined distance or the second player moves from the preset position of the second player by the second predetermined distance.

8. The method of claim 3, further comprising:
determining an available playing area for the gesture-based game; and
updating at least one of the preset position of the first player and the preset position of the second player based on the determined available playing area.

9. The method of claim 3, wherein the determining is based on an input by at least one of the first player and the second player.

10. The method of claim 1, further comprising:
displaying the output image on a display device.

11. A position-setup component for a gesture-based game system, comprising:
a cropping unit configured to crop, from an image of a first player and an image of a second player, a sub-image of at least part of the first player and a sub-image of at least part of the second player, respectively, in a first predetermined size and a second predetermined size based, respectively, at least in part on a preset position of the first player and a preset position of the second player;
an adjusting unit configured to adjust the sub-image of at least part of the first player and the sub-image of at least part of the second player;
a merging unit configured to merge the adjusted sub-image of at least part of the first player and the adjusted sub-image of at least part of the second player into an output image; and
a player position determination unit configured to determine whether the first player and the second player are positioned at the preset position of the first player and the preset position of the second player, respectively.

12. The position-setup component of claim 11, further comprising:
a guideline generation unit configured to generate a first guideline associated with the preset position of the first player and a second guideline associated with the preset position of the second player.

13. The position-setup component of claim 11, further comprising:
a detection unit configured to detect a movement of the first player and the second player.

14. The position-setup component of claim 13, further comprising:
an alarm unit configured to generate an alarm upon a determination that at least one of the first player and the second player strays from the respective preset positions.

15. The position-setup component of claim 11, wherein the adjusting unit is further configured to enlarge the sub-image of at least part of the first player at a first enlargement rate and the sub-image of at least part of the second player at a second enlargement rate.

16. The position-setup component of claim 15, wherein the first enlargement rate and the second enlargement rate are associated with the preset position of the first player and the preset position of the second player, respectively.

17. A computer-readable non-transitory storage medium having stored thereon computer-executable instructions that, in response to execution, cause a position-setup component for a gesture-based game system to perform operations, comprising:
cropping, from an image of a first player and an image of a second player, a sub-image of at least part of the first player and a sub-image of at least part of the second player, respectively, in a predetermined size based, respectively, at least in part on a preset position of the first player and a preset position of the second player;
determining whether to adjust the sub-image of at least part of the first player and the sub-image of at least part of the second player;
responsive to a determination to adjust the sub-image of at least part of the first player and the sub-image of at least part of the second player, adjusting the sub-image of at least part of the first player and the sub-image of at least part of the second player; and merging the adjusted sub-image of at least part of the first player and the adjusted sub-image of at least part of the second player into an output image.

18. The computer-readable non-transitory storage medium of claim 17, wherein the adjusting includes:
    enlarging the sub-image of at least part of the first player and the sub-image of at least part of the second player at a first predetermined enlargement rate and a second predetermined enlargement rate, respectively.

19. The computer-readable non-transitory storage medium of claim 17, further comprising:
    determining whether the first player and the second player are positioned at the preset position of the first player and the preset position of the second player, respectively.

20. The computer-readable non-transitory storage medium of claim 19, further comprising:
    generating a first guideline associated with the preset position of the first player and a second guideline associated with the preset position of the second player.

21. The computer-readable non-transitory storage medium of claim 19, further comprising:
    determining whether at least one of the first player and the second player strays from the respective preset positions during a playing of a gesture-based game; and
    generating an alarm upon determining that at least one of the first player and the second player strays from the respective preset positions during the playing of the gesture-based game.

22. The computer-readable non-transitory storage medium of claim 19, further comprising:
    determining an available playing area for the gesture-based game; and
    updating at least one of the preset position of the first player and the preset position of the second player based on the determined available playing area.

* * * * *